United States Patent
Mikkonen et al.

(10) Patent No.: US 8,597,432 B2
(45) Date of Patent: Dec. 3, 2013

(54) STARCH-BASED FILLER AND COATING PIGMENT COMPOSITION FOR FIBRE WEBS AND METHOD FOR THE MANUFACTURE THEREOF

(75) Inventors: Hannu Mikkonen, Rajamäki (FI); Mauno Miettinen, Lappeenranta (FI); Kirsi Kataja, Helsinki (FI); Saija Luukkanen, Joensuu (FI); Soili Peltonen, Rajamäki (FI); Pia Qvintus-Leino, Espoo (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 818 days.

(21) Appl. No.: 11/990,444

(22) PCT Filed: Aug. 17, 2006

(86) PCT No.: PCT/FI2006/000281
§ 371 (c)(1),
(2), (4) Date: Apr. 16, 2008

(87) PCT Pub. No.: WO2007/020327
PCT Pub. Date: Feb. 22, 2007

(65) Prior Publication Data
US 2009/0255441 A1 Oct. 15, 2009

(30) Foreign Application Priority Data
Aug. 17, 2005 (FI) ...................................... 20050833

(51) Int. Cl.
*C08B 30/00* (2006.01)
(52) U.S. Cl.
USPC .................................. 127/34; 127/37; 127/65

(58) Field of Classification Search
USPC ................ 241/5, 18, 19, 23, 24.1; 106/162.1, 106/162.7, 162.71, 162.8, 162.81, 162.82, 106/162.9, 163.01, 168.01, 172.1, 206.1, 106/207.1; 127/34, 37, 65; 536/86, 102, 536/107, 108
See application file for complete search history.

(56) References Cited

U.S. PATENT DOCUMENTS

| 4,044,198 A * | 8/1977 | Kostrzewa et al. ............. 536/86 |
| 4,102,503 A * | 7/1978 | Meinass ......................... 241/18 |
| 4,415,124 A | 11/1983 | Carduck et al. |

FOREIGN PATENT DOCUMENTS

| DE | 4231305 A1 * | 3/1993 |
| JP | 11-334199 A | 12/1999 |
| WO | WO-02/07984 A2 | 1/2002 |
| WO | WO-2005/030844 A1 | 4/2005 |

OTHER PUBLICATIONS

Kunststoffe vol. 63 (1973) No. 10, p. 749 "Kaltmahlen löst schwierige Mahl-Probleme".

\* cited by examiner

*Primary Examiner* — Basia Ridley
*Assistant Examiner* — Heng Chan
(74) *Attorney, Agent, or Firm* — Birch, Stewart, Kolasch & Birch, LLP

(57) ABSTRACT

A material which is suitable as filler or coating pigment for a fibrous web and a method for manufacturing thereof. According to the method, a feed comprising organic polymer material is cooled to at least approximately −50° C., after which it is refined in a jet refiner to a desired particle size. The present invention generates uniform pigment particles which comprise, for instance, starch esters, and which particles have a porous surface structure, in which case they are suitable for instance as coating pigments and fillers for offset and ink-jet papers.

12 Claims, 2 Drawing Sheets

Figure 1:
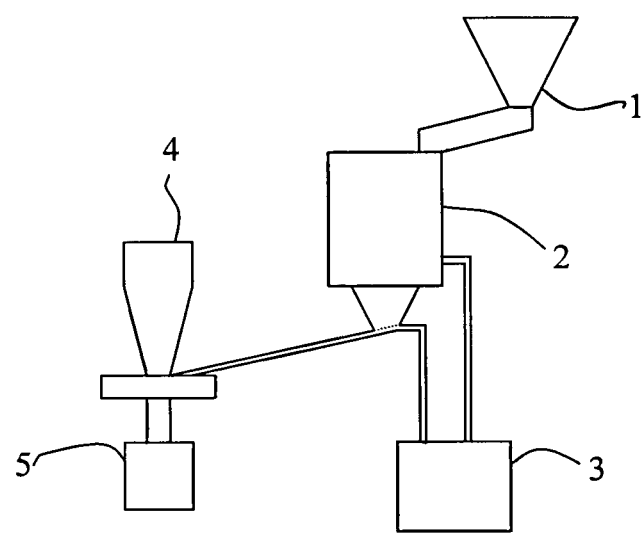

STARCH-BASED FILLER AND COATING PIGMENT COMPOSITION FOR FIBRE WEBS AND METHOD FOR THE MANUFACTURE THEREOF

The present invention relates to a method of producing a starch-based filler and a coating pigment composition, according to the preamble of Claim 1.

In a method such as this, a starch-based initial material or corresponding organic polymer is refined in a dry phase to a desired particle size, using a suitable refining technique.

The present invention also relates to a filler and a coating pigment composition according to Claim 10.

In paper-making, different pigments have traditionally been used to improve the brightness and opacity of the paper. Generally, these pigments have been inorganic and their density has been approximately 2.1-5.6 kg/dm$^3$. However, organic pigments, such as urea-formaline resin pigment and polystyrene pigment, the density of which are 1.1 and 1.05 respectively, have long been used, too. However, certain problems are associated with these organic pigments. Thus, the polystyrene pigment does not withstand the heat of the drying section of the paper mill without melting, and the UF pigment disintegrates easily and discharges formalin.

When pigments are used as a paper filler, it is always a challenge to keep the pigment in the fibre network when water is removed from the paper, i.e. pigment retention. A large difference in density reduces retention, and must be counteracted by the addition of several auxiliary agents. Consequently, a pigment, the density of which is close to the density of the paper fibre or water, i.e. approximately 1000 kg/m$^3$, is always preferable when making paper.

For many years, attempts have been made to generate pigments possessing a high light-scattering coefficient and a high brightness. Furthermore, the use of ink-jet printers has given the pigments a totally new function. In these devices, the picture or the text is generated from drops of a few picolitres. Here, it is very advantageous that the pigment or the fibre adsorbs the solvent of the colouring agent so that the colouring agent of the drop cannot spread as the diffusion takes place. In particular, this applies to paper with a pigment coating.

A method for producing porous particles from starch-based initial materials is described in our previous application (FI patent application 20040741). In that method, the particles are prepared using a two-stage method in which the starch-based material is first dissolved in an organic solvent or a mixture of an organic solvent and a non-solvent, for instance water, from which mixture the starch component is subsequently precipitated by diluting the solution with a non-solvent.

This method generates essentially round, porous particles. These are suitable, for instance, as fillers and pigments for paper. The derivatives are thermoplastic (Tg is typically approximately 150-160° C.), which is advantageous, because, among other things, during the calendering stage, the particle undergoes moulding, which makes the paper glossy. Esterification (for instance acetylation) improves the thermal stability of the product, when compared with native starches. This is advantageous especially when the product is used as a pigment at an elevated temperature.

The purpose of the present invention is to generate an alternative solution for the production of porous starch derivative particles.

The present invention is based on the idea that the solid, starch-based initial material is cooled and then refined in a jet refiner to a desired fineness. This process generates particles that have a narrow particle size distribution and a porous surface structure, and which possess very good optical properties. These particles can be used for coating and filling paper. If desired, the organic particles can be refined together with inorganic particles.

As a result of the above, the present invention generates a pigment which is used to coat and fill a fibrous web comprising paper or cardboard, and which pigment comprises an organic polymer, the surface structure of which is made porous and the porosity is obtained by jet refining the product at a reduced temperature, especially as a feed of a temperature of −50 . . . −195° C.

More specifically, the method according to the present invention is mainly characterized by what is stated in the characterizing part of Claim 1.

The product according to the present invention is, in turn, characterized by what is stated in the characterizing part of Claim 10, Considerable advantages can be achieved with the present invention. The solution according to the invention is suitable also for those materials that are not dissoluble in easily vaporized organic solvents. Consequently, as the initial material a starch polymer (for instance acetyl, DS=1) can be used, which is considerably more affordable than derivatives with a high degree of substitution, and which in the known technology is not suitable as raw material for pigments (dissolution/precipitation technique), because it is almost totally insoluble in water and organic solvents.

According to another preferred embodiment of the present invention, starch acetate is prepared, which has a degree of substitution between 1 and 3 and which is refined using jet refining to a particle size of approximately 1 to approximately 100 μm. Although said product is initially produced by precipitation, unexpected advantageous changes have been observed according to our present invention when the jet refining is carried out using a very cold material.

It is possible to carry out the refining as an extension of the process of the production of a starch derivative, for instance starch acetate.

In one of the applications according to the present invention, it is possible to choose a desired starch acetate/mineral pigment ratio, for instance calcium carbonate/starch acetate ratio, for the composition of the paste which is to be prepared. The extent of the applicability of the method is exemplified by the fact that the inorganic component in the refining of the starch raw material can very well be a water soluble salt, such as sodium acetate.

It should be noted that both starch processing companies and the paper-producing industry are considerably interested in organic, especially starch-based, pigments, because of their combustibility, lightness and good technical properties.

In the following, the present invention will be examined in more detail with the help of the enclosed pictures and a detailed explanation.

Figure 2:
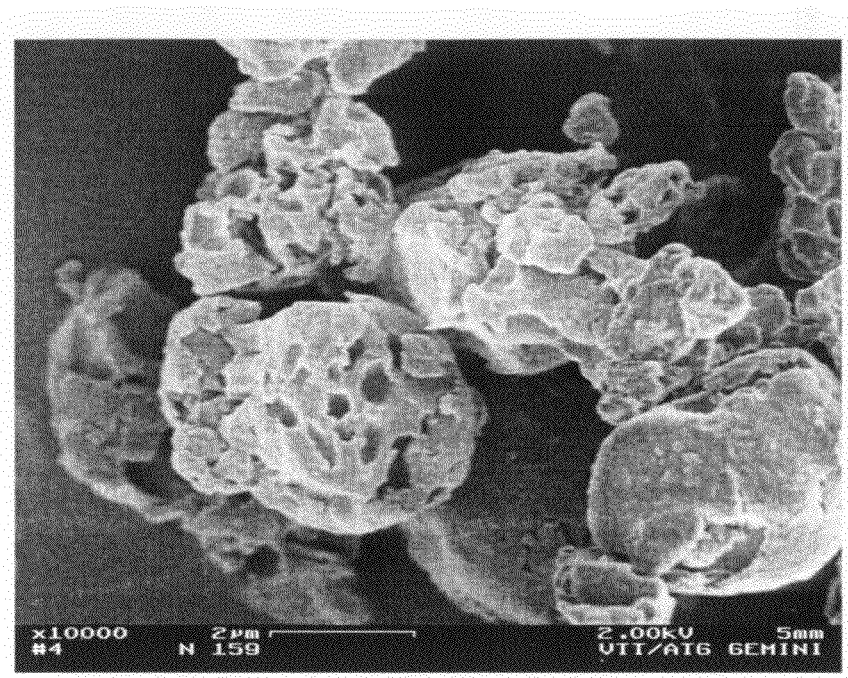
Figure 3:
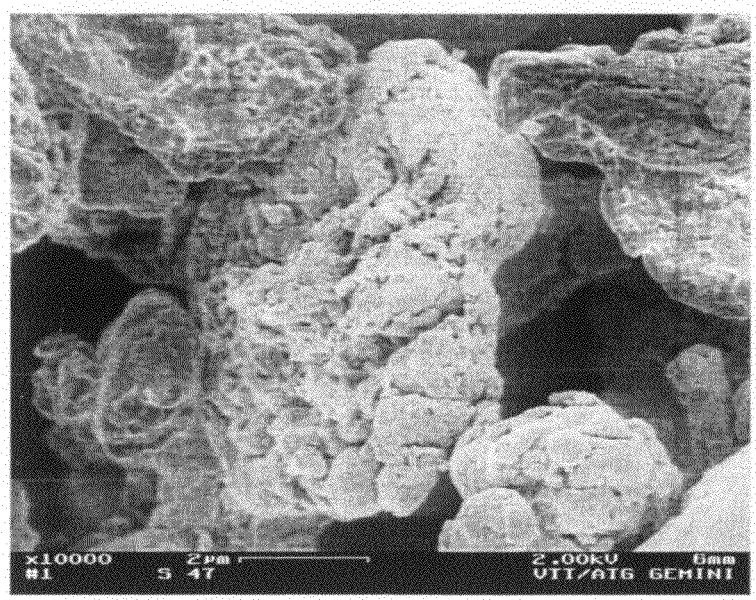

FIG. 1 shows the basic structure from the front of the equipment used for the application of the present invention, FIG. 2 shows a SEM picture of starch acetate which has been refined using a liquid nitrogen cooled jet mill, and FIG. 3 shows a SEM picture of starch acetate, which has been refined using a jet mill without cooling.

According to the present invention, after a possible pre-refining, the solid, starch-based initial material is refined by jet refining to a desired particle size. Hereby the initial material is typically accelerated by compressed air to a high speed and driven into a solid wall, a wall rotating in the opposite direction or a similar pigment spray that is directed in the opposite direction. This jet refining method generates average particle sizes ranging from approximately 1 to approximately 100 µm.

A precondition for a refining such as the one described above is that the material is solid, i.e. the temperature is at least below the glass transition temperature ($T_g$). According to the present invention, it has been found that the lower the refining temperature is, the brittler will be the organic polymeric materials which are treated in the invention. The refining will generate a totally novel pigment, which is suitable for production of paper (and cardboard and similar fibrous webs). Typically, the density of the pigment is approximately 1.5 and the average particle size is 14-40 µm. The particles have a narrow particle size distribution, which means that 75% of all particles have a diameter which is at maximum approximately two times the average diameter of all particles.

The feed is water-free or essentially water-free (the water/moisture content is most suitably less than 2 weight %, especially less than 1 weight %).

FIG. 1 shows one form of application of the equipment used in the present invention. There is a vibrating feeder 1, through which the feed, such as the starch derivative, is fed into a cooled feeding vessel 2. The feeding vessel 2 is connected to a device 3 for cooling the feed air. According to the present invention, the feed is cooled to a reduced temperature, i.e. to a temperature below room temperature. Most suitably, the temperature of the material to be treated is kept low throughout the refining process. The feed is cooled to for instance at least −50° C., most suitably at least −100° C., especially at least −120° C. and preferably at least −150° C., after which it is refined in a jet refiner 4. According to one application, the feed is cooled essentially to the temperature of liquid nitrogen (approximately −190 . . . −195° C.).

Most suitably, the refining gas (for instance air or gaseous nitrogen) used for the jet refining is cooled separately. Most suitably, the gas is cooled to a temperature which corresponds to the temperature of the feed or the temperature of the cooling agent.

In the examples of our invention, liquid nitrogen (temperature approximately −190° C.) was used as the cooling agent for cooling the material and the compressed air of the jet. Certainly, other cooling agents, too, such as dry ice, can be used for the cooling. The pressure of the compressed air is generally approximately 1.5-10 bar.

The feed rate varies, depending on the material and the device, but generally it can be approximately 10-10,000 g/min, especially approximately 50-1000 g/min.

Because of the low temperature, a smaller particle size is generated when the refining takes place in the jet mill than would occur if the refining were carried out at room temperature. The SEM photographs showed that the starch particles have fine structures (pits, pores or small particles), which are advantageous for the light scattering, and the sizes of which structures are clearly less than 1000 nm, which, for its part, explains the significantly high ISO brightness of the paper coating. At the start, the button brightness of the material was 85 and after the refining 87.8.

When the starch acetate is refined at a low temperature, its fine structure/porosity is maintained and, according to the SEM pictures, it even seems to increase, which is not the case when refining the product without cooling.

Even though this invention describes the suitability of starch acetate for low temperature jet mill refining, it is possible in principle to use this process for refining any other (organic) polymer, the physical properties of which meet the criteria demanded of pigment raw material. Especially polysaccharide-based polymers, such as polymers which are based on cellulose, starch or chitin are refined. Examples of these are esters of cellulose and chitin (for instance cellulose-acetate) and starch derivatives, the last mentioned ones being especially preferable.

Accordingly, the starch-based component which is used as the initial material in the present invention can be, for instance, a "functional" starch derivative. This means that this product is generated from starch by a chemical reaction, and that at least part of its anhydroglucose units comprises groups that modify hydroxyl functions. Typically, the starch derivative is a starch ester prepared from native starch, hydrolyzed starch, oxidized starch, crosslinked starch or gelatinized starch. Starch ethers form another suitable initial material group. The derivative can be a starch ester/ether, too, or a mixture of two or more starch derivatives.

The starch, in turn, can be based on any natural starch, the amylose content of which is 0-100% and the amylopectin content 100-0%. Accordingly, the starch can be sourced from barley, potato, wheat, oats, pea, corn, tapioca, sago, and rice, or similar tuber vegetables and cereal crops.

The use of a starch-based component that is sourced from an ester has been found suitable, one which is formed of starch and one or several aliphatic $C_{2-24}$ carboxyl acids. In this case, the carboxyl acid component of an ester such as this can be derived from a lower alkane acid, such as acetic acid, proprionic acid or butyric acid, or a mixture of them. According to a preferred embodiment, the starch component is an esterified starch, most suitably a starch acetate, the degree of substitution of which is 0.5-3, preferably 1.5-3 and most suitably 2-3. The degree of substitution of the starch ester is chosen in such a way that the product is essentially insoluble in the precipitant used in the method.

Provided that the glass transition point of the starch ester is high enough for the desired application, the carboxyl acid component can in principle be sourced from natural saturated or unsaturated fatty acids, too. Examples of these are palmitinic acid, stearic acid, oleic acid, linolic acid, and mixtures of them. The ester may also comprise both long and short chain carboxyl acid components. An example of these is a mixed ester of acetate and stearate. Besides acids, corresponding acid anhydrides, and acid chlorides and other corresponding reactive acid derivatives, too, can be used to form esters in a way which is known per se.

The production of fatty acid esters of starch is carried out as described for instance in the following trade journals: Wolff, I. A., Olds, D. W. and Hilbert, G. E., The acylation of Corn Starch, Amylose and Amylopectin, J. Amer. Chem. Soc. 73 (1952) 346-349 or Gros, A. T. and Feuge, R. O., Properties of Fatty Acid Esters of Amylose, J. Amer. Oil Chemists' Soc 39 (1962) 19-24.

Lower ester derivatives, such as starch acetate, can be prepared by bringing the starch to react with an acid anhydride which corresponds to the ester group, for instance acetic anhydride, in the presence of a catalyst. For instance, 50% sodium hydroxide is used as the catalyst. In addition, other known methods of manufacturing acetates, which are described in the trade literature, are suitable for the production of starch acetate. By varying the quantity of acetic anhydride, the quantity of alkali used as the catalyst, and the reaction time, it is possible to produce starch acetates which have different degrees of substitution. Starch acetate can be produced for instance with the methods according to FI patent 107386 or U.S. Pat. No. 5,667,803, or with other methods which are commonly used in acetylation of starch.

It is possible to preferably modify the properties of starch ester by forming transglycosylate products of them.

According to another preferred embodiment, the starch component is an ester of a hydroxy alkylated starch. In this case, hydroxypropylstarch esters are more preferable, the molar degree of substitution of which is at maximum 2, preferably at maximum 1 and more preferably 0.1-0.8, and the degree of substitution at least 1, most suitably at least 2, preferably 2.5-3.

In the present invention, an organic polymer, such as starch polymer, which has a glass transition temperature of at least +60° C., most suitably at least 80° C., preferably at least 100° C. and especially approximately 150-165° C. or higher, is chosen. One of the initial criteria for choosing the glass point is that neither the manufacturing and operating temperature of the pigment or the filler, nor the temperature of the manufacturing process of the end product, will exceed the glass transition temperature of the product—except only momentarily—to prevent the pigment or the filler from losing their favourable, light-scattering optical properties.

The polymer chain comprises at least 10 glucose units and at least 1 acetyl group per glucose unit. According to a preferred embodiment, the polymer chain comprises 100-150 glucose units and 2-3 acetyl groups per glucose unit. According to another embodiment, the body of the starch is disintegrated in such a way that its separation from the solution into spherical particles takes place spontaneously. The distribution of the molecular weight of the starch polymer can be wide. According to a preferred embodiment, the poly-dispersity index of starch polymers is 1.5-2.0.

The so called slurry method, in which the natural particle size of the starch grain is preserved because the starch does not gelatinize during the manufacturing, can also be used for the production of derivatives which have low degrees of substitution (DS≤1). The refining can be carried out as an extension of the production process. The acetate can be modified, too (hydroxy-alkylated, transglycosylized, hydrolyzed, crosslinked).

According to a preferred embodiment, the technique employed of the present invention can be used to refine the starch acetate, the degree of substitution of which is preferably between 1<DS≤3, by using a liquid nitrogen cooled jet mill, to a particle size which at its best is <5 μm (90% of the product), in which case the material is suitable as such both as filler and pigment, which improve the brightness and the opacity of the paper.

Within the degree of substitution range of 1<DS≤3 the starch acetate is a thermoplastic, water-insoluble and biodegradable polymer, the glass transition temperature of which is in the range of 155-165° C., depending on the molecular weight and the starch quality.

According to the SEM pictures, at high degrees of substitution, the starch acetate is a slightly porous material, the specific surface of which is 4.8-10.5 m²/g, depending on the technique employed to dry the product.

The mineral particles and starch components (or similar organic components), which are needed for the coating or filling of the paper, can be refined simultaneously to a desired particle size. In this application, the water-free starch acetate particles (at the initial stage an average of 90 μm) collide with mineral particles or salt crystals which have a higher specific hardness and density, whereby these collisions with each other lead to a reduction in their sizes. On the basis of the physico-chemical properties (glass transition point +160° C. and refractive index 1.47) of the starch polymer, it can be justifiably presumed that the material improves the optical properties of coated or filled paper during the calendering process.

The ratio between the organic polymer particles and the mineral particles can vary freely. Typically, the quantity of the organic particles is at least 5 weight % of the total particle quantity, and most suitably approximately 10-95 weight %. In the example, 0-80 weight % of mineral pigment among the organic pigments has been used.

Examples of mineral particles are calcium carbonate, gypsum, aluminium silicate, kaolin, aluminium hydroxide, magnesium silicate, talc, titanium dioxide, barium sulphate, zinc oxide, and mixtures of them.

Products which have been manufactured using this method and, correspondingly, pigments which have a porous structure, can be used for instance as pigments and fillers for offset and ink-jet papers.

The following non-restrictive examples illustrate the present invention:

EXAMPLE 1

Different Techniques Used to Test the Refining of Starch Acetate (DS 2.8)

The tests carried out to examine the refining of starch acetate were performed using a pearl mill, a jet mill and a liquid nitrogen jet mill. The fluid jet refining was carried out with a device shown in FIG. 1, whereby the time required to cool the material (feed) before it was refined was 15 min and the quantity of the feed in the tests was 200-500 g. The feed rate depended on the material, but on average it was approximately 50 g/min.

Table 1 shows the particle sizes achieved in the refining

TABLE 1

The particle sizes of the refined starch acetates (Device: Coulter LS-130)

| Pass % | Feed Particle size μm | Pearl mill Particle size μm | Jet mill Particle size μm | Liquid nitrogen jet mill Particle size μm |
|---|---|---|---|---|
| 10 | 3.3 | 1.4 | 2.2 | 1.5 |
| 25 | 8.5 | 2.2 | 3.6 | 2.1 |
| 50 | 57.6 | 3.8 | 6.0 | 3.0 |
| 75 | 292 | 6.9 | 9.0 | 4.2 |
| 90 | 451 | 12.1 | 11.5 | 5.5 |

The results in Table 1 show that the liquid nitrogen jet mill, the structure of which is shown in FIG. 1, produced a distinctly smaller average particle size and maximum particle size of the product than did the other methods. On the basis of the SEM pictures (FIGS. 2 and 3), there is a clear micropore structure both within and on the surface of the starch particles, and, when compared with that of the initial stage, this structure seems to have increased during the liquid nitrogen cooled jet mill refining process. Refining at room temperature generated a more closed microstructure (SEM).

The ISO brightness of the starch acetate, which was refined with the liquid nitrogen cooled jet mill, was measured as the button brightness, which was 87.8, and, correspondingly, 85 of the initial material used.

The product was used to coat paper, too. The brightness measured from the coated paper was 82 and the opacity 98, with a coat weight of 14 g/m². The corresponding values for untreated paper were 62 and 95. Compared with the 200-400 nm spherical starch acetate pigments or porous pigments, which were prepared using the dissolution-precipitation technique in patent application FI 20035173, brightness and opacity levels of the same magnitude were achieved with the corresponding coat weights, when coating paper.

EXAMPLE 2

Refining of Starch Acetate in the Presence of Calcite

Table 2 shows the particle size distribution of a product which was generated by refining starch acetate (80%) and coarse calcite (SIF concentrate, 20%) together in the corresponding conditions as in Example 1. On the basis of the particle size distribution, the calcite remains somewhat coarser than the starch. However, the result is promising considering that the calcite is not very suitable for refining in a jet mill.

TABLE 2

Combined refining of starch acetate (DS 2.8) and coarse calcite (250-500 μm) using a liquid nitrogen cooled jet mill, the particle size distribution determined with a Coulter LS-130.

| Pass (%) | Refined product Particle size (μm) |
|---|---|
| 10 | 1.9 |
| 25 | 3.0 |
| 50 | 5.2 |
| 75 | 9.2 |
| 90 | 20.3 |

The product can be used as such as pigment in a paper application, if only part of the mineral pigment is to be replaced by an organic starch-based product. The thermoplastisizing of the starch acetate at the calendering stage improves, among other things, the gloss of the coated paper.

EXAMPLE 3

Refining of Starch Acetate Which has a Low Degree of Substitution

Table 3 shows the result of refining a starch acetate which has a lower degree of substitution (DS 1) with liquid nitrogen cooled jet mill refining, expressed based upon the particle size. The results show that the average particle size was reduced from a level of 90 μm to a level of 19 μm, which demonstrates that the refining technique is suitable for lower degrees of substitution, too.

TABLE 3

Refining of starch acetate (DS 1) using a liquid nitrogen cooled jet mill, particle size distribution: Coulter LS-130

| Pass (%) | Feed TA133 Particle size (μm) | Liquid nitrogen jet mill Particle size (μm) |
|---|---|---|
| 10 | 26.2 | 4.6 |
| 25 | 56.9 | 9.6 |
| 50 | 89.9 | 18.9 |
| 75 | 133 | 40.9 |
| 90 | 186 | 108 |

In these refinings, the starch acetate acted differently compared with the mineral pigment; the surplus comprised a coarser fraction.

The invention claimed is:

1. A method of manufacturing a material, comprising:
cooling a feed comprising a polysaccharide-based organic polymer having a water/moisture content of less than 2 weight % to below 0 degrees C.;
separately cooling a refining gas to below 0 degrees C.; and refining said feed in a jet refiner with the cooled refining gas to a desired particle size which is suitable in both size and physical properties as a filler or coating pigment for a fibrous web.

2. The method according to claim 1, wherein the feed is cooled to at least −50° C., after which it is refined in the jet refiner.

3. The method according to claim 2, wherein the refining gas is cooled to a temperature which corresponds to the temperature of the feed.

4. The method according to claim 1, wherein the polysaccharide-based organic polymer has a glass transition temperature of at least +60° C.

5. The method according to claim 1, wherein the glass transition temperature of the polysaccharide-based organic polymer is not exceeded during the refining.

6. The method according to claim 4, wherein the organic polymer material is refined together with a mineral material.

7. The method according to claim 4, wherein the organic polymer material comprises a starch derivative, which is starch ester, starch ether, starch ester/ether, or a mixture of them.

8. The method according to claim 1, wherein a product is prepared, which comprises starch acetate with a degree of substitution between 1 and 3, and which product comprises 0-80 weight % of other pigment which is needed in the preparation of the fibrous web and which has been refined together with the starch acetate.

9. The method according to claim 2, wherein the feed is cooled to at least −150° C., after which it is refined in the jet refiner.

10. The method according to claim 4, wherein the glass transition temperature of the organic polymer is +165° C. or higher.

11. The method according to claim 1, wherein the feed comprising the polysaccharide-based organic polymer comprises less than 2 weight % of water or moisture.

12. The method according to claim 1, wherein the feed comprising the polysaccharide-based organic polymer comprises less than 1 weight % of water or moisture.

* * * * *